(No Model.)
J. SCHNEIBLE.
MANUFACTURE OF FERMENTED LIQUORS.
No. 571,693. Patented Nov. 17, 1896.
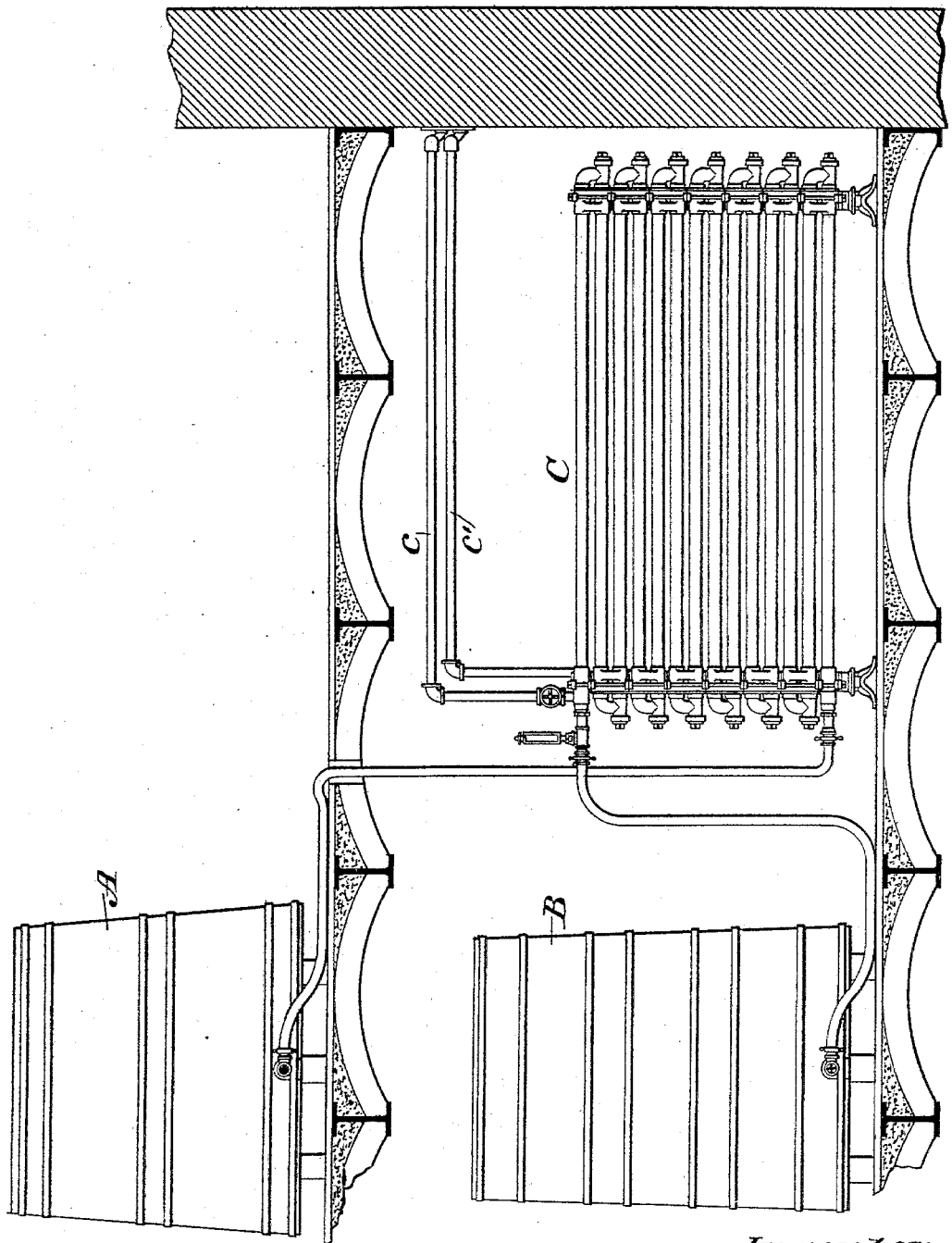

UNITED STATES PATENT OFFICE.

JOSEPH SCHNEIBLE, OF NEW YORK, N. Y., ASSIGNOR TO THE JOSEPH SCHNEIBLE COMPANY, OF SAME PLACE AND JERSEY CITY, NEW JERSEY.

MANUFACTURE OF FERMENTED LIQUORS.

SPECIFICATION forming part of Letters Patent No. 571,693, dated November 17, 1896.

Application filed April 24, 1896. Serial No. 588,895. (No model.)

*To all whom it may concern:*

Be it known that I, JOSEPH SCHNEIBLE, a citizen of the United States, residing in the city, county, and State of New York, have invented certain new and useful Improvements in the Manufacture of Fermented Liquors, of which the following is a specification, reference being had to the accompanying drawing, forming a part hereof.

This invention relates to the manufacture of fermented liquors, such, for example, as ale, beer, cider, wine, &c., and is herein described with especial reference to the manufacture of lager-beer, although it is not restricted to the manufacture of that particular beverage.

In the manufacture of lager-beer as usually carried on hitherto the beer leaves the fermenting-vat at a temperature of $2\frac{1}{2}°$ Réaumur to $3\frac{1}{2}°$ Réaumur and at that temperature is brought to the stock-vats which stand in a cellar where the temperature is ordinarily about $1°$ Réaumur. Here the beer is allowed to stand while the temperature slowly falls, those albuminoids which will coagulate at the temperature slowly separate, and the suspended matter is precipitated, it usually requiring about six to ten weeks or longer to effect a satisfactory precipitation. It not infrequently happens that fermentation continues to progress in the stock-vats, the extent of this continued fermentation varying more or less at different times, wherefore the degree of attenuation of the beer cannot be precisely determined or fixed in advance, which is an exceedingly important consideration, especially when the beer is to be finished by the artificial introduction of carbon dioxid. Moreover, it sometimes happens that the objectionable or undesirable albuminoids, that is to say, those albuminoids which should be coagulated and separated, are not completely coagulated in the time during which the beer is allowed to remain in the stock-vats and do not separate as they should, with the result that the finished beer on being exposed to low temperature becomes slightly turbid, especially in the case of bottled beer. Having all of these difficulties in mind, I have sought to improve the process of manufacturing beer or other fermented liquors, such as ale, cider, wine, &c., so far as concerns the treatment of the beer or other liquid subsequent to its introduction into the fermenting-vats, to the end that a saving of time might be effected, a rapid coagulation and separation of objectionable albuminoids and a corresponding precipitation of other suspended matter and of the coagulated albuminoids be facilitated, an absolute cessation of fermentation be effected whenever the beer or other liquid in the fermenting-vats has reached the desired degree of attenuation, and the production of beer or other liquid of absolutely uniform standard of attenuation be assured, whereby the finished product, even when artificially carbonated, shall also be absolutely uniform as to attenuation.

In accordance with my invention the fermentation of the beer or other liquid in the fermenting-vat is allowed to continue until the desired degree of attenuation is reached, the fermentation being kept in check in the fermenting-vat by the use of attemperators in the usual manner. The beer is then drawn from the fermenting-vat and is conducted to the stock-vats in a cellar, where the temperature in well-regulated stock-houses is usually about $1°$ Réaumur, but in its passage from the fermenting-vat to the stock-vat the temperature of the beer is reduced to a point at least as low as the temperature of the cellar in which the stock-vat stands, being preferably reduced to a temperature of about $0°$ Réaumur or lower, so that when it reaches the stock-vat it shall have already a temperature at least as low as that of the atmosphere surrounding the stock-vat.

It is wholly immaterial, so far as the scope of the invention is concerned, what form or kind of apparatus is employed in practicing it; but to enable others to understand readily how to practice the invention I have represented in elevation in the accompanying drawing, which forms a part hereof, one form of apparatus in which the novel process may be carried on. In the apparatus there represented an ordinary fermenting-vat A is shown as connected with an ordinary stock-vat B through a cooler C, which is shown as of the well-known contra-stream variety, having pipes $c\ c'$ for the conduction of the cooling medium to and from the same. As the beer or other liquid passes through the cooler in a continuous stream it is quickly brought to the desired temperature, the time consumed depending upon the original temperature of the beer or other liquid, the velocity of its movement, the capacity of the apparatus, and the temperature of the cooling medium.

It will be understood, of course, that the invention is not limited in any respect by anything herein disclosed as to the construction, arrangement, form, or kind of the apparatus in which it may be practiced.

As a consequence of the reduction of temperature herein referred to the fermentation is arrested before the beer or other liquid reaches the stock-vat, wherefore there can be no further fermentation in the stock-vat and no further change in the attenuation of the beer or other liquid, whether it remains in the stock-vat a short time or a long time. As a further consequence the objectionable albuminoids and other matter are practically coagulated when they reach the stock-vat and are in condition for immediate precipitation, which begins soon after the liquid reaches the stock-vat and progresses rapidly, other suspended matter being precipitated and facilitating the precipitation of the coagulated albuminoids. Finally the precipitation is not interfered with by currents within the body of the liquid and therefore takes place much more rapidly and completely than in the ordinary process of manufacture where beer is brought down to the stock-vat at a temperature of $2\frac{1}{2}°$ Réaumur to $3\frac{1}{2}°$ Réaumur, which not only is not low enough to absolutely stop fermentation, but is higher than the temperature of the surrounding atmosphere, wherefore, by contact with the cooler atmosphere of the cellar, the beer is cooled at its surface more rapidly than elsewhere, and the cooler particles sink and are replaced by others continually, thereby establishing currents within the body of the liquid which interfere with and retard the necessary precipitation. It is also to be observed that whatever gas is contained in the liquid is retained and held in absorption therein by reason of the low temperatures and the absence of any increase of temperature, and the body of the liquid is therefore not disturbed by rising bubbles of gas.

Practical use of my improvement in the manufacture of beer and ale has demonstrated that in from twenty-four to forty-eight hours from the time the beer enters the stock-vat the precipitation has progressed to a greater degree of perfection than is usually attained in a period of two or more weeks under the old process of manufacture, and, furthermore, that no change in attenuation takes place, no matter how long the beer remains in the stock-vat, thereby showing a complete cessation of fermentation and insuring the possibility of securing a product of absolutely uniform attenuation. The beer treated by the improved process, provided no albuminoids are subsequently introduced, remains bright even if exposed after finishing to very low temperatures, showing a complete separation in the stock-vat of all matters which are separable by reduction in temperature, so that there remains nothing which can be separated thereafter. Although the improved process has been devised with especial reference to the finishing of beer by carbonating, nevertheless it will be found equally advantageous when beer is to be finished in the old way of kraeusening, it being necessary only to use sugar kraeusen and thereby avoid the introduction of albuminoids. It should be observed with reference to the manufacture of cider and wines by the new process that to obtain the best results the cider or wine should be treated in substantially the same manner as ale or beer, that is to say, it should be kept at a low temperature in a stock-vat or its equivalent for a considerable time to permit the desired coagulation and precipitation to take place.

I claim as my invention—

The improvement in the manufacture of fermented liquors, which consists in continuing the fermentation in the fermenting-vat until the desired degree of attenuation has been reached, then withdrawing the liquor from the fermenting-vat and conducting it to the stock-vat, and reducing the temperature of the liquor in its passage from the fermenting-vat to the stock-vat to a temperature at least as low as the temperature of the atmosphere about the stock-vat and sufficiently low to arrest fermentation.

This specification signed and witnessed this 22d day of April, A. D. 1896.

JOSEPH SCHNEIBLE.

In presence of—
 A. N. JESBERA,
 W. B. GREELEY.